Patented Aug. 10, 1926.

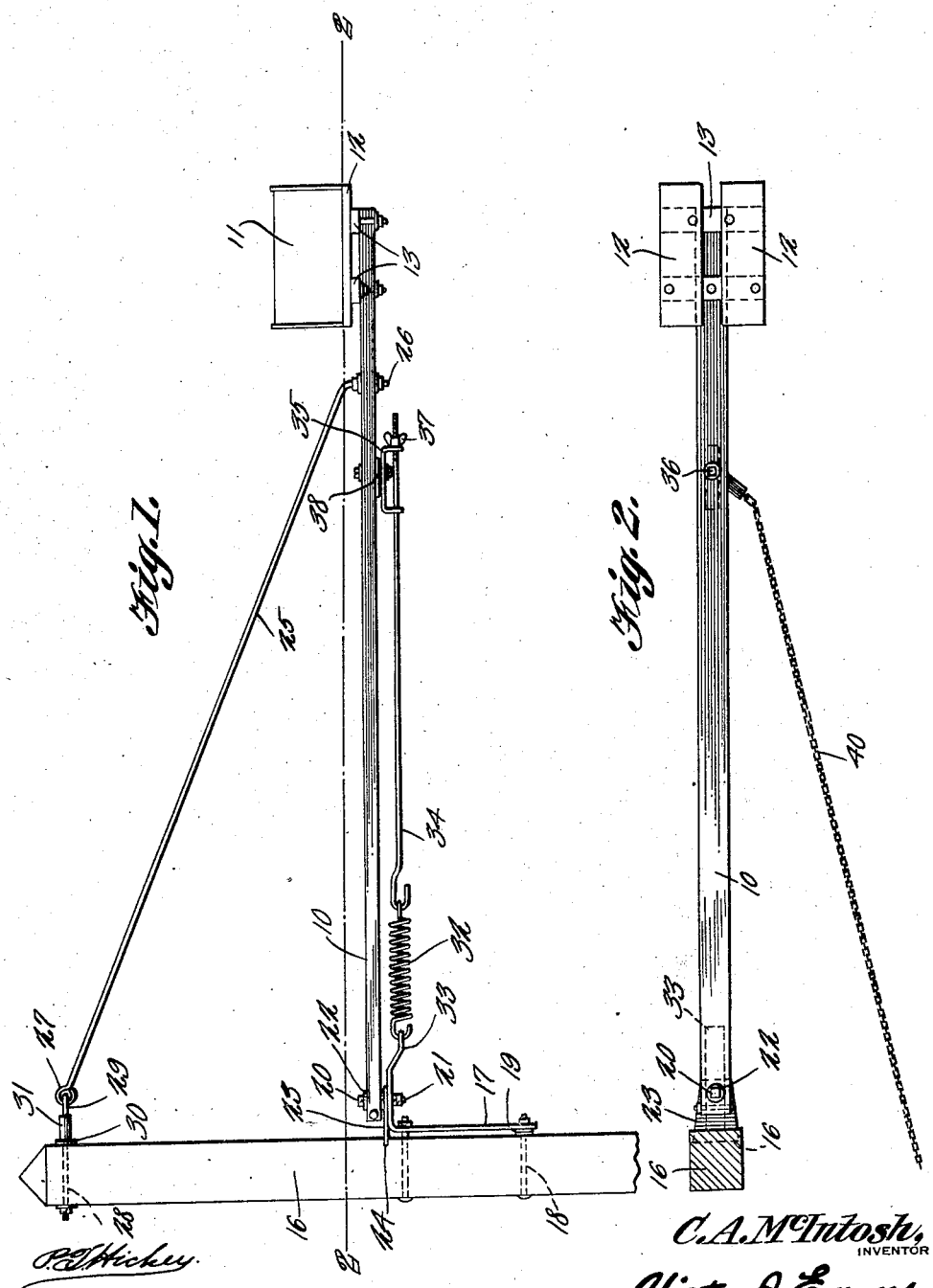

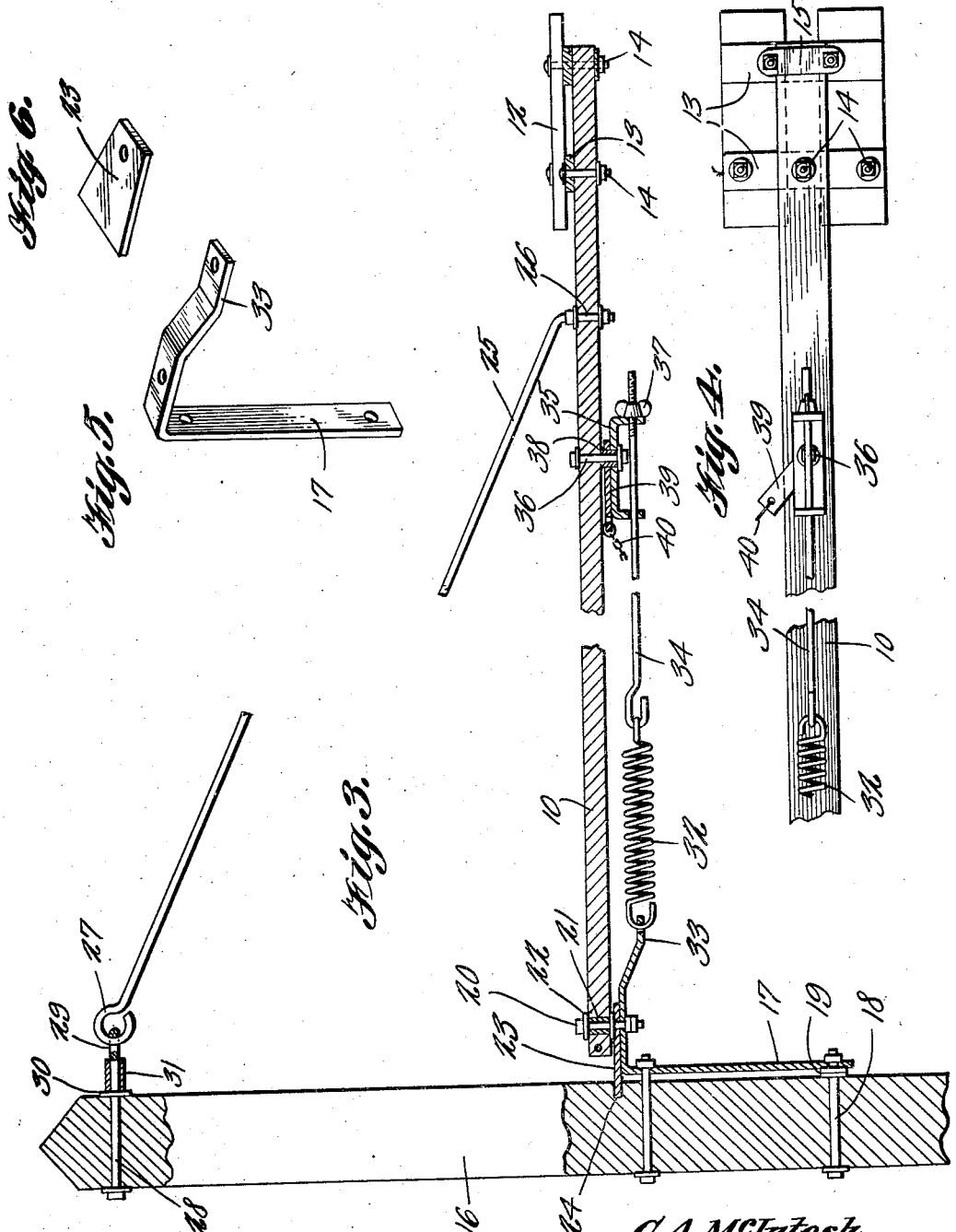

1,595,206

UNITED STATES PATENT OFFICE.

CLAYTON A. McINTOSH, OF GREYBULL, WYOMING.

SUPPORT.

Application filed December 26, 1924. Serial No. 758,230.

This invention relates to improvements in supports, an object being to provide a pivotally mounted swinging arm which is especially adapted for supporting mail boxes or other receptacles in rural districts and which may be conveniently mounted upon a gate or other post.

Another object of the invention is the provision of a supporting arm for the above purpose which will be yieldingly held in extended position and which is provided with means whereby said arm may be swung inward and its movement in one direction limited.

Another object of the invention is the provision of novel means for pivotally securing the arm in place and for connecting the yieldable holding means to a stationary member and to the arm, the last mentioned means also providing convenient means for connecting the pivotal movement limiting means.

With the above and other objects in view, the invention further includes the following novel features and details of construction, to be hereinafter more fully described, illustrated in the accompanying drawings and pointed out in the appended claims.

In the drawings:—
Figure 1 is an elevation showing a fragmentary portion of a gate or other post with the invention applied.

Figure 2 is a section taken substantially on the line 2—2 of Figure 1.
Figure 3 is a fragmentary sectional view on an enlarged scale.

Figure 4 is a fragmentary bottom plan view of the swinging arm.

Figure 5 is a detail perspective view of the bracket.

Figure 6 is a similar view of the kerf plate.

Referring to the drawings in detail wherein like characters of reference denote corresponding parts, the reference character 10 indicates a supporting arm which is designed to have mounted upon its outer end a mail box or other receptacle 11. For this purpose the outer end of the arm carries a base 12 which is secured by means of cleats 13, bolts 14 and a strap 15 to the arm.

The inner end of the arm is mounted for swinging movement on a post or standard 16 which may be a gate or fence post. For this purpose there is provided a substantially L-shaped bracket 17 having one arm secured to the standard 16 by means of bolts 18 which pass through the bracket. One of these bolts may be provided with spacing washers 19 to properly position the bracket. The other arm of the bracket is provided with an opening for the passage of a pivot bolt 20 which extends through a spacing sleeve 21 mounted within an opening provided at the inner end of the swinging arm 10, the sleeve 21 having washers 22 at each end thereof so that the arm 10 will have free swinging movement. Also mounted upon the bolt 20 is a kerf plate 23 whose outer end is provided with an opening for the passage of said bolt and whose inner end is positioned within a kerf 24 provided in the standard 16. The plate 23 acts to steady the bracket 17 and prevents any lateral pivotal movement of the bracket.

The outer end of the arm 10 is supported by a hanger rod 25 having one end pivotally secured within the arm as shown at 26 while the opposite or upper end of the rod 25 is provided with an eye 27 which engages an eye bolt 28 extending through the standard 16. The bolt 28 is provided with an eye 29 at one end and with washers 30, while a spacing sleeve 31 is positioned between one of the washers and the eye 29.

In order to yieldingly hold the arm 10 in extended position there is provided a spring 32 whose inner end is connected to the offset extension 33 of the bracket 17. The opposite end of the spring is connected to the inner end of an adjusting rod 34, the outer end of which passes through aligned openings provided in an inverted substantially U-shaped bracket or plate 35. This plate is pivotally secured to the arm 10 by means of a pivot bolt 36 and the rod 35 is adjusted through the medium of a thumb nut 37. By adjusting the nut 37 the tension of the spring 32 may be regulated.

Positioned upon the bolt 36 which extends through the plate 35, is a spacing sleeve or thimble 38, while pivotally mounted upon this sleeve or thimble 38 is one end of a link 39. The sleeve or thimble thus provides a pivot for both the plate and link and prevents binding of these members. The opposite end of the link 39 has connected thereto one end of a chain or cable 40, the opposite end of which may be connected to the fence or other stationary member. This chain or cable 40 in addition to limiting swinging movement of the rod in one direction may also be utilized for pulling the rod inward parallel with the fence.

The invention is susceptible of various changes in its form, proportions and minor details of construction and the right is herein reserved to make such changes as properly fall within the scope of the appended claims.

Having described the invention what is claimed is:—

1. A support comprising a standard, a substantially L-shaped bracket having one arm rigidly secured to the standard, and the other arm extending outwardly therefrom, a supporting arm having its inner end pivotally secured to said other arm of the bracket, a hanger rod having one end secured to the pivotally mounted arm and its opposite end secured to the standard for supporting the outer end of the supporting arm, a spring located beneath the supporting arm and having one end connected to the outwardly extending arm of the L-shaped bracket and means connected to the opposite end of the spring and pivotally secured to the supporting arm for yieldingly holding said supporting arm against movement.

2. A support comprising a standard, a substantially L-shaped bracket having one arm secured to the standard, a supporting arm having its inner end pivotally secured to the other arm of the bracket, a hanger rod having one end secured to the pivotally mounted arm and its opposite end secured to the standard for supporting the outer end of the supporting arm, a spring located beneath the supporting arm and having one end connected to the L-shaped bracket, a rod having one end secured to the opposite end of the spring, a substantially U-shaped plate pivotally secured to and spaced beneath the supporting arm and having aligned openings for receiving one end of the rod and an adjusting nut mounted upon the rod and engaging the U-shaped plate for adjustig the tension of the spring and yieldingly holding the supporting arm against movement.

3. A support comprising a standard, a substantially L-shaped bracket having one arm secured to the standard, a supporting arm having its inner end pivotally secured to the other arm of the bracket, a hanger rod having one end secured to the pivotally mounted arm and its opposite end secured to the standard for supporting the outer end of the supporting arm, a spring located beneath the supporting arm and having one end connected to the L-shaped bracket, a rod having one end secured to the opposite end of the spring, a substantially U-shaped plate pivotally secured to and spaced beneath the supporting arm and having aligned openings for receiving one end of the rod and an adjusting nut mounted upon the rod and engaging the U-shaped plate for adjusting the tension of the spring and yieldingly holding the supporting arm against movement, a link pivotally mounted between the U-shaped bracket and supporting arm and a flexible member having one end secured to the link whereby said supporting arm may be moved pivotally against the action of the spring and its pivotal movement in one direction limited.

4. A support comprising a standard, a substantially L-shaped bracket having one end secured to the standard, a supporting arm, a pivot bolt extending through said supporting arm and bracket, a spacing sleeve surrounding the pivot bolt and extending through the supporting arm, washers mounted upon said bolt at the opposite ends of the spacing sleeve, whereby the supporting arm will be secured to the bracket for free pivotal movement, a hanger rod having one end secured to the pivotally mounted arm and its opposite end secured to the standard for supporting the outer end of the supporting arm, a spring located beneath the supporting arm and having one end connected to the L-shaped bracket and means connected to the opposite end of the spring and pivotally secured to the supporting arm for yieldingly holding said supporting arm against movement.

In testimony whereof I affix my signature.

CLAYTON A. McINTOSH.